(12) United States Patent
Yagodkin

(10) Patent No.: US 7,894,692 B2
(45) Date of Patent: Feb. 22, 2011

(54) METHOD AND DEVICE FOR SUPPRESSING HIGH-ORDER MODES IN MM FIBERS

(75) Inventor: Roman Yagodkin, Worcester, MA (US)

(73) Assignee: IPG Photonics Corporation, Oxford, MA (US)

( * ) Notice: Subject to any disclaimer, the term of this patent is extended or adjusted under 35 U.S.C. 154(b) by 156 days.

(21) Appl. No.: 12/468,225

(22) Filed: May 19, 2009

(65) Prior Publication Data

US 2010/0296774 A1 Nov. 25, 2010

(51) Int. Cl.
G02B 6/26 (2006.01)
(52) U.S. Cl. ............................. 385/28; 385/15; 385/27; 385/31; 385/123
(58) Field of Classification Search .................. 385/15, 385/27, 28, 31, 123
See application file for complete search history.

(56) References Cited

U.S. PATENT DOCUMENTS

| 5,193,027 A | 3/1993 | Preston |
| 5,796,891 A | 8/1998 | Poustie |
| 6,422,043 B1 * | 7/2002 | DiGiovanni et al. .......... 65/402 |
| 7,646,955 B2 * | 1/2010 | Donlagic .................... 385/124 |

* cited by examiner

*Primary Examiner*—Jennifer Doan
(74) *Attorney, Agent, or Firm*—Yuri Kateshov

(57) ABSTRACT

A laser system includes a multimode fiber (MMF) having a permanent perturbation region which is provided at the predetermined distance from the upstream end of the MMF. The perturbation region is configured so that propagating fundamental and at least one high-order mode (HOM) originated upstream from the perturbation region are split into multiple HOMs which are substantially in counterphase. Hence, the HOMs destructively interfere with and substantially cancel one another.

20 Claims, 1 Drawing Sheet

US 7,894,692 B2

METHOD AND DEVICE FOR SUPPRESSING HIGH-ORDER MODES IN MM FIBERS

BACKGROUND OF THE DISCLOSURE

1. Field of the Disclosure

The present disclosure relates to a single mode (SM) fiber laser system configured with a multimode active fiber which is structured so that high-order modes propagating along the multimode fiber are substantially eliminated.

2. Prior Art Discussion

The use of multimode (MM) active fibers, i.e., fibers provided with a gain medium doped with rare-earth elements, permits rapid power scaling. However, increased powers are achieved at expense of some power loss in a single mode (SM) fiber laser system configured with a MM active fiber, or the poor quality of beam (high $M^2$ factor[1]) in multimode laser systems. Both of the above are a result of excitation and amplification of high order transverse modes (HOM) which, on one hand, drain power from the pump light, thereby depriving a fundamental mode of some of this light power, and, on the other hand, couple with a fundamental mode.

[1] A parameter for quantifying the output laser beam quality.

Many applications in need for high power SM output beams cannot tolerate even an insignificant loss of power. Similarly, MM laser systems with a high $M^2$ factor are not acceptable for a variety of applications. Hence numerous techniques for filtering HOMs have been developed and are briefly discussed below.

One of the techniques for suppressing HOMs in a MM fiber without substantially affecting a single, fundamental mode provides for suitably designing the fiber index and dopant profiles. Still other techniques include configuring special cavities, tapering the fiber ends, or carefully adjusting the launch conditions of an input beam. Yet a further technique is associated with introducing bend losses, which can act as a form of distributed spatial filtering and suppress all but the fundamental mode of a MM fiber, yielding a single mode, powerful output. In some instances, the known methods produce satisfactory results but are cost-ineffective, in others, the known methods are simply do not yield the desired results.

A need, therefore, exists for a method of substantially eliminating high-order modes propagating along a multimode active fiber in a simple, cost-effective manner.

Another need exists for a MM fiber configured in accordance with the disclosed method.

Still a further need exists for a laser system configured with the disclosed MM fiber.

SUMMARY OF THE DISCLOSURE

The disclosed method, laser system implementing the method and MM fiber incorporated in the laser system meet these needs. The basic concept underlying the present disclosure provides for intentional exciting multiple modes at a predetermined along the MM fiber, but in such a manner that HOMs substantially cancel one another. The basic concept, thus, is rather counterintuitive because it calls for the intentional loss of power of fundamental mode during the initial stage of the disclosed method.

In accordance with one aspect, the disclosed method includes permanently providing a perturbation region at a distance from the upstream end of a MM active fiber. The perturbation region is provided upon exposing a fiber region to an excitation of the predetermined value at the desired distance from the upstream end of the MM active fiber. The region is so configured that when a fundamental and at least one HOM are incident upon the region, the same multiple HOMs are excited with the same amplitude, but substantially in counterphase. As a consequence, the excited HOMs destructively interfere with one another and, therefore, substantially cancel one another within a short distance from the perturbation region. The fundamental mode—the only mode left after HOMs have canceled one another—is amplified while propagating through a gain medium to the output of the MM active fiber. Despite the fact that the fundamental mode looses power to multiple high order modes, it is fully amplified while propagating through the gain medium downstream from the region since the pumping energy is totally concentrated on this single mode.

The perturbation region—region characterized by impurities modifying the refractive index of the host material—needs to be created only once and then functions as long as the MM active fiber is in use. Hence, the disclosed method is referred to as a passive method hereinafter.

Another aspect of the disclosure is concerned with an MM fiber configured to implement the disclosed method. The MM fiber has a perturbation region provided by applying an external excitation of the predetermined value at the desired distance from the upstream end of the fiber. Multiple modes impinging upon the region split into a fundamental, albeit less powerful, mode and two or more HOMs. The newly excited HOMs distractively interfere with and substantially cancel one another. The pumping energy from a pump unit is thus fully concentrated on the propagating fundamental mode that practically restores its power lost to the HOMs.

Still a further aspect relates to a laser system incorporating the disclosed MM fiber. The disclosed method and MM active fiber are equally effective when incorporated in with SM and MM laser systems. Preferably, the disclosed systems are configured exclusively with all fiber components. However, as readily understood by an artisan, laser systems may not be all fiber and have a variety of other configurations. Moreover, although the following text refers to MM active fibers, of course, the disclosed method is effective for passive MM fibers as well.

BRIEF DESCRIPTION OF THE DRAWINGS

The above and other features of the disclosure will become more readily apparent from the following specific description better understood in conjunction with the accompanying drawings, in which.

SPECIFIC DESCRIPTION

Figure 1:
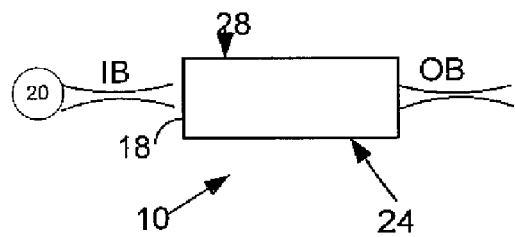
FIG. 1 is a schematic representation of a multimode active fiber configured in accordance with the disclosure.

Reference will now be made in detail to the disclosed device and method. Wherever possible, same or similar reference numerals are used in the drawings and the description to refer to the same or like parts or steps. The drawings are in simplified form and are far from precise scale. Although the modes exited in the region of perturbation are referred to as "new", one of ordinary skills in the art readily realizes that these modes are the same as respective initial mode, but with lower amplitudes.

FIG. 1 illustrates an active multimode fiber (MMAF) 24 which may operate in a continuous wavelength mode or a pulsed mode and is configured so as to prevent or at least substantially cancel multiple high order modes (HOMs) supported by MMAF 24. An input beam IP generated by a source of light 20 is coupled into an upstream end 18 of MMAF 24. The latter is configured with a core capable of supporting, for example, a fundamental mode $LP_{01}$ and at least one or more high-order modes LPhm. As known, the core of AF 24 is provided with a gain medium doped with rare earth elements which are selected from the group consisting of Yb, Er, Tm, Nd, Ho and their combination and any other suitable elements. The gain medium is capable of amplifying light by stimulated emission of radiation.

In accordance with the disclosure, the suppression or filtering of high order modes (HOMs) is attained by providing MMAF 24 with a permanent index-perturbed region 28 at the predetermined distance from upstream end 18 thereof. The index-perturbed region 28 is formed by providing an external excitation applied to MMAF 24. The distance and force are so selected that only a fundamental mode $Lp_{01}$ propagates downstream from the region; HOMs substantially cancel one another soon after region 28.

Figure 2:
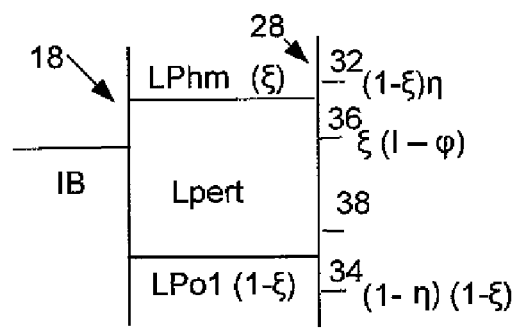
FIG. 2 is a diagrammatic view illustrating the process occurring as in input light impinges on subsequent—upstream and downstream interfaces.

FIG. 2 illustrates physical process involved in the formation of perturbation region 28. As the input beam IB is incident upon upstream end 18 of MMAF 24 at a working wavelength, it "branches" into an initial fundamental mode $LP_{01}$ and at least one initial high-order mode LPhm. The total power of the input beam can be distributed between, for example, the LPhm containing a small part $\xi$ of the total power of the SM beam and initial fundamental mode $LP_{01}$ carrying the major part $(1-\xi)$ of the total power. While HOMs may contain only a small percentage of total power, even an insignificant amount of total power may detrimentally affect the power of signal in SM laser systems provided with MM active fiber 24 or the beam quality in MM laser systems.

Initially upon impinging upon upstream end 18, the modes $LP_{01}$ and LPhm have the same phase, but by the time the modes reach region of perturbation 28, the modes are out of phase and desirably are in counterphase, i.e. modes $LP_{01}$ and LPhm are $\pi$-shifted relative to one another.

When initial fundamental and high-order modes $LP_{01}$ and LPhm, respectively, are coupled into region of perturbation 28, each undergoes the process analogous to that one of the IB at upstream end 18 of MMAF 24. Specifically, initial fundamental mode $LP_{01}$ excites a new high order mode LPhm 32, which has the same phase as the fundamental mode when the latter impinges perturbation region 28, and, of course, a fundamental mode 34 having a smaller amplitude than the initial one. In other words, the initial fundamental mode further looses its $\eta$ power to the newly excited high-order mode 32. Numerically, thus, high-order mode 32 has power of $(1-\xi)\eta$, whereas newly-excited fundamental mode 34 is left with a power equal to $(1-\xi)(1-\eta)$. All of the above means that fundamental mode has lost not, for example, 1% to the initial HOM LPhm, but 2% upon encountering perturbation region 28.

The high order mode, upon encountering region 28, further propagates in two high-order modes—one, 36, with the power $\xi(1-\zeta)$, and other 38 containing $\xi'$. The latter is too small to affect the power distribution and is neglected. The high-order mode 36 has the same phase as initial HOM LPhm.

As a result, new HOMs 32 and 36, like initial $LP_{01}$ and LPhm, are out of phase. Moreover, preferably, the modes 32 and 36 are in counterphase. As known to one of ordinary skill in the laser arts, the modes in counterphase destructively interfere. The destructive interference, in turn, leads to the mutual cancellation of new HOMs 32 and 36. The remaining fundamental mode 34 propagates through the gain medium and maximally amplified, because the energy from a pump (not shown) is not shared by multiple modes, but concentrated only on FM 34.

The above-disclosed technique can be realized by determining a perturbation length $L_{pert}$ between upstream end 18 and region 28, respectively (FIG. 2) as follows:

$$L_{pert} = \frac{\pi \cdot (2 \cdot m + 1)}{\beta_1 - \beta_2}, \quad (1)$$

where $L_{pert}$—the perturbation length, m—natural integer and $\beta_1$ and $\beta_2$ are the propagation constants of respective fundamental and high-order modes which can be determined based on the distribution of the refractive index. Once the length is determined, preferably single perturbation region 28 is permanently formed. However, a few regions can be formed as well at respective points of the fiber. The selected length should be such that the original fundamental and high-order modes reach perturbation region 28 being in counter-phase relative to one another. Since the $\beta_1-\beta_2$ differ from one another at the value in the order of about $10^{-3}$, $L_{pert}$ will be about $500_{MKM}(2m+1)$. Note that while the above equation 1 relates to a single HOM, one of ordinary skills in the laser art readily understands that $L_{pert}$ can be easily determined for multiple HOMs. From the physics standpoint, if multiple HOMs are exited upon coupling input light IB into the upstream end of MMAF 24, the perturbation region should be formed in the point where all HOMs are in counterphase with the fundamental mode.

The perturbation region 28 is nothing more than impurities created by a variety of methods. However, region 28 should be provided so that the power excited in new HOMs 32 and 36 be expressed as follows.

$$\xi \cdot (1-\zeta) \approx \eta \cdot (1-\xi) \quad (2)$$

Where the left part of the equation 2 is a power contained in new HOM 32 and the right side is a power contained in new HOM 36. Note that equation 2 is correct for small values which are typically encountered in practice.

As to the variety techniques, it can be a splice or connection between two different MM AF, wherein the upstream length corresponds to $L_{pert}$. Other examples may include an arc charge which modifies the configuration of fiber 24, or a mechanical stress such as bending, twisting, pressing or a thermal stress and etc. produced at the desired perturbation length.

A particularly advantageous technique includes cutting the same MMAF fiber into two lengths, wherein one of the lengths corresponds to the desired $L_{pert}$. Thereafter, the two lengths are coupled together. The coupling may be realized by splicing or by a mechanical mean.

The effectiveness of the suppression of HOMs, of course, depends on whether region 28 is formed exactly at the desired length $L_{pert}$ (where the phases of respective initial $LP_{01}$ and LPhm are shifted exactly at $\pi$) or not. Assuming that the initial LPhm mode carries the $\xi$ part of the total power of the input beam, and the $\eta$ is the power lost to new HOM 32 in FIG. 2, the following two situations are to be considered.

The first one relates to the situation when the created length is desired. The suppression coefficient Ksup is then calculated as $$K_{sup} = \frac{1}{\left(1 - \sqrt{\frac{\eta}{\xi}}\right)^2}, \quad (3)$$

Thus, in the ideal case, when $\xi=\eta$, the K sup will be the highest possible coefficient.

The other situation relates to the region 28 provided at a length differing from the desired. The suppression coefficient can be then determined as $$K_{sup} = \frac{1}{2 \cdot (1 - \cos(\delta))} \quad (4)$$

where δ is a phase shift differing from π. Based on equation 4, it is easy to see that even if region 28 is not provided at the desired length, the coefficient of suppression Ksup still may be high enough for HOMs 32 and 36, respectively, to substantially cancel one another.

It will be apparent to those skilled in the art that various modifications and variations can be made in the presently disclosed laser system. For example, the disclosed laser system can operate as a single frequency system, but can be equally effective operating in a multi-frequency mode. Thus, it is intended that the present disclosure cover the modifications and variations of this disclosure provided they come within the scope of the appended claims and their equivalents.

The invention claimed is:

1. A multimode fiber (MMF) comprising:
   spaced apart upstream and downstream ends, the upstream end receiving an input beam splitting into initial fundamental mode (FM) and at least one high-order mode (HOM); and
   a region of perturbation spaced from the upstream end and configured so that the initial fundamental and at least one HOM, impinging upon the region, excite a plurality of new HOMs and a new fundamental mode,
   wherein the plurality of new HOMs destructively interfere with and substantially cancel one another between the region and downstream end of the MMF.

2. The MMF of claim 1, wherein the perturbation region is provided at a predetermined distance from the upstream end of the MM, the predetermined distance being determined as $$L_{pert} = \frac{\pi \cdot (2 \cdot m + 1)}{\beta_1 - \beta_2},$$

where m—natural integer and $\beta_1$ and $\beta_2$ are respective propagation constants of the initial FM and the at least one HOM.

3. The MMF of claim 2, wherein the predetermined distance is selected so that the initial FM and at least one HOM impinge upon the perturbation region while being substantially in counterphase.

4. The MMF of claim 2, wherein the predetermined distance is selected so that the fundamental mode splits into one of the plurality of new HOMs and the new fundamental mode, the initial FM and the one newly excited HOM being in phase.

5. The MMF of claim 4, wherein the initial HOM splits into at least one second HOM of the plurality of the new HOMs, the one and second newly exited modes having respective amplitudes substantially equal to one another and respective phases substantially in antiphase.

6. The MMF of claim 1, wherein the input beam splits into the initial FM, at least one HOM and another HOM, the active fiber having a configuration selected from the group consisting of a passive fiber and active fiber.

7. A laser system comprising a multimode fiber (MMF) having spaced apart upstream and downstream ends, an input beam being coupled into the upstream end of the MMF so as to split into an initial fundamental mode (FM) and a high-order mode (HOM),
   the MMF having a region of perturbation located between the upstream and downstream ends, the region being configured to modify refractive indices of respective initial FM and one HOM so that a plurality of new HOMs and a new fundamental mode are exited upon exiting the region,
   wherein the plurality of new HOMs destructively interfere with and substantially cancel one another between the region and downstream end of the MMF.

8. The laser system of claim 7, wherein the perturbation region is provided at a predetermined distance from the upstream end of the MM, the predetermined distance being determined as $$L_{pert} = \frac{\pi \cdot (2 \cdot m + 1)}{\beta_1 - \beta_2},$$

where m—natural integer and $\beta_1$ and $\beta_2$ are a propagation constant of the initial FM and a propagation constant of initial HOM respectively.

9. The laser system of claim 8, wherein the perturbation region is spaced from the upstream of the MMF at the predetermined distance selected so that the initial FM and at least one HOM impinge upon the perturbation region being substantially in counterphase.

10. The laser system of claim 7, wherein the initial FM and at least one HOM split, while propagating through the perturbation region, into the FM and at least two new HOMs, the two HOMs being out of phase.

11. The laser system of claim 10 further comprising an exciter operative to act upon the MMF at the predetermined distance so that the at least two new HOMs have respective amplitudes substantially equal to and related to one another as $$\xi \cdot (1-\zeta) \approx \eta \cdot (1-\xi)$$

where $\xi(1-\zeta)$—a power of one of the at least two HOMs which is excited in the perturbation region upon splitting of the at least one HOM, and $\eta(1-\xi)$—a power of another one of the at least two HOMs which is excited in the perturbation region upon splitting of the initial FM.

12. The laser system of claim 11, wherein the exciter is operative to generate a force applied to the MMF at the predetermined distance and selected from the group consisting of a bending, twisting, thermo and pressing force and a combination of these.

13. The laser system of claim 11, wherein the MMF includes separate parts coupled to one another so as to provide the perturbation region.

14. The laser system of claim 7, wherein the MMF is configured to emit an output beam selected from the group consisting of a SM beam and a MM beam.

15. The laser system of claim 7 further comprising:
a coupling component located upstream from the upstream end of the MMF and selected from the group consisting of fiber and bulk optics, upstream SM passive fiber guiding the SM beam upstream from the MMF, and
a delivery component downstream from the downstream end of the MMF and selected from the group consisting of fiber and bulk optics.

16. The laser system of claim 7, wherein the MMF is an active fiber selected from the group consisting of lasers and amplifiers.

17. A process for filtering high order modes (HOMs), comprising:
providing a multimode fiber (MMF);
coupling an input beam into an upstream end of the MMF so as to excite an initial fundamental mode (FM) and at least one HOM; and
providing a region of perturbation in the MMF at a distance from the upstream end so that the initial FM and at least one HOM are incident upon the region, the region being configured so that the initial FM and one HOM split into a new FM and a plurality of new high order modes (HOMs), wherein the plurality of new HOMs destructively interfere with and substantially cancel one another between the region and a downstream end of the MMF.

18. The method of claim 17, wherein providing the region includes
providing a predetermined disturbance in the MMF at a predetermined distance to form the region, the distance and disturbance being determined so that the initial FM and at least one HOM being substantially in counterphase upon impinging the region, the initial FM and one of the plurality of HOM excited by the initial FM being substantially in phase and the plurality of new HOMs being substantially in counterphase.

19. The method of claim 18, wherein providing the region includes applying a force to the region, wherein the force being selected from the group consisting of a bending, twisting, stressing and electrical force and a combination thereof.

20. The method of claim 18, wherein providing the region includes
severing the MMF at the predetermined distance from the input end thereof; and
coupling the severed parts of the MMF together, thereby forming the region of perturbation, the MMF being selected from the group consisting of a passive fiber and an active fiber.

* * * * *